No. 644,126. Patented Feb. 27, 1900.
B. CHARLES.
NON-PUNCTURE AND SPEEDING ATTACHMENT FOR PNEUMATIC TIRES.
(Application filed Dec. 1, 1899.)
(No Model.)
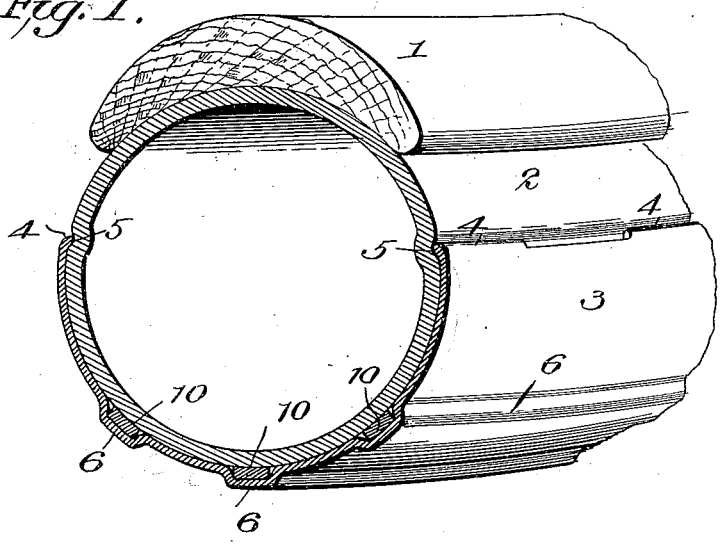
Witnesses
Inventor
Benjamin Charles
by Frank C. Gore
his Attorney

UNITED STATES PATENT OFFICE.

BENJAMIN CHARLES, OF EVANSVILLE, INDIANA, ASSIGNOR OF ONE-HALF TO J. W. RUMINER AND JOSEPH M. KAELIN, OF SAME PLACE.

NON-PUNCTURE AND SPEEDING ATTACHMENT FOR PNEUMATIC TIRES.

SPECIFICATION forming part of Letters Patent No. 644,126, dated February 27, 1900.

Application filed December 1, 1899. Serial No. 738,838. (No model.)

*To all whom it may concern:*

Be it known that I, BENJAMIN CHARLES, a citizen of the United States, residing at Evansville, in the county of Vanderburg and State of Indiana, have invented certain new and useful Improvements in Non-Puncture and Speeding Attachments for Pneumatic Tires; and I do hereby declare the following to be a full, clear, and exact description of the invention, such as will enable others skilled in the art to which it appertains to make and use the same.

This invention relates to protecting-armors for pneumatic tires.

The object of the invention is to provide an improved non-puncturable protecting-armor which will be light and adapted for easy application to the tire without injury thereto or impairing its resiliency when in use and which will offer a superior tread-surface, whereby slipping will be prevented and increased speed be obtained. To accomplish this object, as well as others appearing more fully from the following description, I provide an armor adapted to embrace the tire and provided with a novel form of tread and improved means for holding the armor on the tire.

The details of the invention are fully described hereinafter and the novel features thereof recited in the appended claims.

In the accompanying drawings, Figure 1 is a sectional perspective of a tire equipped with the present invention; Fig. 2, a cross-section; Fig. 3, a detail of a modified form of rivet, and Fig. 4 a detail illustrating how the armor is made in sections.

The rim or felly is shown at 1, while 2 is the pneumatic tire, both of ordinary construction.

The improved protecting-armor, which is shown at 3, consists of a trough-shaped annulus of sheet metal provided with blunt inturned projections 4 along its edges. The edges of the armor are preferably higher than the horizontal diameter of the tire, viewing the latter cross-sectionally, to insure a more perfect retention of the armor, and the armor is of such size that the tire is snugly expanded thereinto when inflated. The projections 4 are not absolutely essential, and the edges of the armor could be turned inwardly throughout their entire length, if desired; but a projection of either kind is desirable, as it takes into the walls of the tire slightly, as shown at 5, and insures against any slipping of the armor on the tire. The armor is provided with one or more ribs 6, formed by pressing out the metal, which extend completely around its circumference. These ribs may be of either V or U shape, or, in fact, of any desired form in cross-section. They not only strengthen the armor, but provide a superior tread. However, I find it very advantageous to provide a facing for these ribs to insure against slipping and obtain better tractive effects, and on each rib (one or more being provided, as found desirable) I secure a strip 7 of elastic fabric, such as rubber, which is held on the rib by rivets 8, passing through it and the armor at suitable distances apart around the circumference of the latter. These strips being of elastic assist in holding the armor on the tire on account of their contractive action.

To illustrate the different forms of strips 7 and different ways of fastening that can be employed, I have shown in Fig. 2 the constructions a, b, and c. At a the rivets are countersunk flush with the surface of the rubber, at b the heads 9 of the rivets are allowed to project in order to obtain a better "bite" on the surface over which the tire is rolling, and at c a broader strip of rubber is employed, which is stretched over the entire rib and has its two edges secured by rivets passing through the body of the armor instead of directly through the rib itself. In practice any one of these forms or a combination thereof can be employed, as found desirable. Other forms could doubtless be used, and I do not therefore limit myself to the use of the forms shown. To further insure against any relative slipping or twisting of the tire and armor, I provide one or more strips 10, of any desired material, which extend completely around the tire, either continuously or in detached sections, in the same circumferential line, and these strips are by preference cemented directly to the outer face of the tire and fit in the concave part of the rib. One of these strips can be employed for each rib or only one for the center rib, as found desirable.

I sometimes prefer to construct the rivets 8 as shown in Fig. 3, where 11 designates a rubber plug fitted in a hole or concavity in the rivet. The plug is adapted to grasp a slippery or icy surface better than the rivet would and prevents all slipping.

As shown in Fig. 4, the armor is preferably made in two or more sections, considered circumferentially thereof, in which case the ribs of one section will fit into the concavities of the ribs of the adjoining section.

It is obvious that various changes could be resorted to in carrying out the invention without departing from the spirit or scope thereof, and I do not therefore limit myself to the precise constructions shown and described.

Having thus described my invention, what I claim as new, and desire to secure by Letters Patent, is—

1. The combination with a tire, of an armor therefor, made in sections considered circumferentially of the tire, and an elastic strip or band encircling the armor circumferentially and fastened to it, which secures the armor to the tire.

2. The combination with a tire, of an armor therefor, made in sections considered circumferentially of the tire, and an elastic strip or band encircling the armor circumferentially, and rivets connecting said strip to the armor, said strip being adapted to hold the armor on the tire.

3. The combination with a tire, of an armor therefor having an external rib, and an independent tractive facing secured to the face of said rib.

4. The combination with a tire, of an armor therefor having an external raised corrugation or rib, an independent tractive facing-strip for said rib, and rivets securing the strip to the face of the corrugation or rib.

5. The combination with a tire, of an armor therefor having an external corrugation or rib, an independent tractive facing-strip for said rib, and rivets passing through said strip and rib and having their heads projecting beyond the face of the strip.

6. The combination with a tire, of an armor therefor having an external circumferential rib and an internal circumferential concavity substantially in alinement therewith, of a circumferential strip on the tire which fits in the concavity, and a facing-strip on the exterior of the rib.

7. The combination with a tire, of an armor therefor, strips on said armor, rivets securing the strips to the armor, and plugs fitted in the rivets.

In testimony whereof I affix my signature in presence of two witnesses.

BENJAMIN CHARLES.

Witnesses:
J. W. RUMINER,
F. C. GORE.